(12) United States Patent
Musgrove

(10) Patent No.: US 10,694,069 B2
(45) Date of Patent: Jun. 23, 2020

(54) FAX BOARD INCOMPATIBILITY DETECTION AND CIRCUMVENTION

(71) Applicant: Concord III, L.L.C., Seattle, WA (US)

(72) Inventor: Ralph Musgrove, Davie, FL (US)

(73) Assignee: CONCORD III, L.L.C., Seattle, WA (US)

( * ) Notice: Subject to any disclaimer, the term of this patent is extended or adjusted under 35 U.S.C. 154(b) by 0 days.

(21) Appl. No.: 16/297,533

(22) Filed: Mar. 8, 2019

(65) Prior Publication Data

US 2019/0208080 A1 Jul. 4, 2019

Related U.S. Application Data

(63) Continuation of application No. 15/855,179, filed on Dec. 27, 2017, now Pat. No. 10,257,380, which is a continuation-in-part of application No. 15/603,917, filed on May 24, 2017, now Pat. No. 10,154,169.

(51) Int. Cl.
*H04N 1/00* (2006.01)
*H04N 1/32* (2006.01)

(52) U.S. Cl.
CPC ....... *H04N 1/32678* (2013.01); *H04N 1/0022* (2013.01); *H04N 1/00042* (2013.01); *H04N 2201/0093* (2013.01); *H04N 2201/3209* (2013.01)

(58) Field of Classification Search
CPC .......... H04N 1/32708; H04N 1/00206; H04N 1/00307; H04N 1/32406; H04N 1/32719; H04M 1/72522; G06Q 30/0267
USPC ....................................................... 358/1.14
See application file for complete search history.

(56) References Cited

U.S. PATENT DOCUMENTS

| 2010/0149998 | A1 | 6/2010 | Schryer |
| 2014/0118794 | A1 | 5/2014 | Seo |
| 2016/0165510 | A1* | 6/2016 | Jun ...................... H04W 36/22 370/230 |
| 2017/0230544 | A1* | 8/2017 | Watts ................. H04N 1/00212 |

* cited by examiner

*Primary Examiner* — Saeid Ebrahimi Dehkordy
(74) *Attorney, Agent, or Firm* — Steven M. Greenberg, Esq.; Shutts & Bowen LLP

(57) ABSTRACT

Embodiments of the present invention provide for a method, system, and computer program for increasing the success of a facsimile transmission. In an embodiment of the invention, the method includes monitoring an incoming facsimile number transmitting a fax image by a carrier and on the condition that a threshold failure rate is met or exceeded for the carrier transmitting the fax image on the incoming facsimile number, adjusting the carrier to a new carrier.

14 Claims, 6 Drawing Sheets

FAX BOARD INCOMPATIBILITY DETECTION AND CIRCUMVENTION

CROSS-REFERENCE TO RELATED APPLICATIONS

This application is a Continuation Application of U.S. application Ser. No. 15/855,179, filed on Dec. 27, 2017, which is a Continuation-in-Part of U.S. patent application Ser. No. 15/603,917, filed on May 24, 2017, now pending, all of the teachings of which are incorporated herein by reference in their entirety.

BACKGROUND OF THE INVENTION

Field of the Invention

The present invention relates to electronic communication and, more particularly, to facsimile communication.

Description of the Related Art

Traditionally, fax (short for facsimile) is the telephonic transmission of scanned printed material (both text and images). The original document is scanned into a fax machine and the contents are processed as a single fixed graphic image that is converted into a bitmap, which is then transmitted through the telephone system. A receiving fax machine converts the coded image before printing a paper copy. Originally, the scanned data was transmitted using an analog signal, but now, the data is more commonly transmitted via a digital signal. A fax can also be sent over IP (Facsimile over Internet Protocol (FoIP)), where a digitalized image is sent over an IP network using JPEG compression. More recently, a fax can be sent and received without using a traditional physical fax. For example, a fax can be sent and received via a personal computer using computer software or an internet fax service.

The capabilities of a fax machine can be categorized based on several indicators, such as group, class, data transmission rate, and conformance with ITU-T recommendations. The International Telecommunications Union (ITU) is an international standards body for telecommunications. Specifically, the ITU Telecommunication Standardization Sector (ITU-T) publishes different recommendations for the transmission of fax over a network. For example, T.30 is an ITU recommendation that specifies the session management procedures that support the establishment of a fax transmission, and T.38 is an ITU recommendation for allowing the transmission of fax over IP networks in real time.

The ITU also publishes fax protocols. For example, Group 3 protocol, first published in 1980, specifies the switched analog network and is an all-digital procedure. In addition, Group 3 allows two stations to agree on such things as transmission speed and page size. Further, the Group 3 protocol may be specified in several standards, such as T.4 and T.6, which specify the image transfer protocols and T.30. Facsimile protocols do not describe a specific implementation; therefore, different vendors have slightly different implementations of a fax protocol resulting in some fax devices having more difficulty with one type of fax board or soft fax than another.

BRIEF SUMMARY OF THE INVENTION

Embodiments of the present invention address deficiencies of the art in respect to fax board incompatibility and circumvention and provide a novel and non-obvious method, system, and computer program product for increasing the likelihood of success of facsimile transmissions. In an embodiment of the invention, a transmission context for an incoming facsimile is determined. Thereafter, it is determined whether a prior facsimile of the same transmission context had been unsuccessfully transmitted. In response to determining that there had been a prior unsuccessful transmission for the facsimile of the same transmission content, a configuration of a fax server is changed or a different fax server is selected to transmit the facsimile to a designated fax recipient. The facsimile is transmitted subsequent to the changing of the configuration of the designated fax server or the selection of the different fax server. Further, a database is updated with information about the transmission context, configuration, and/or fax server once the facsimile has been transmitted successfully or unsuccessfully.

In another embodiment of the invention, a facsimile management system is provided. The system includes a session initiation protocol (SIP) proxy executing in memory of a computer and a fax server coupled to the SIP proxy as well as a database coupled to both the fax server and SIP proxy. The SIP proxy includes a SIP proxy module that contains program code enabled to determine a transmission context for an incoming facsimile and to determine whether a prior facsimile of the same transmission context had been unsuccessfully transmitted by the designated fax server. The SIP proxy module further includes program code enabled to determine whether to change hardware in response to determining that there had been a prior unsuccessful transmission for the facsimile of the same transmission context and to change the equipment in response to determining that the equipment needs to be changed. Additionally, the SIP proxy module includes program code to update the database with information related to the transmission context and hardware.

The facsimile management system further includes a fax server module executing in memory of the fax server. The fax server module includes program code to determine whether to change a configuration of the fax server and to change the configuration of the fax server in response to determining such a change is needed. Thereafter, the database is updated with the changed configuration and the corresponding transmission context.

In yet another embodiment of the invention, a record is written to a database that indicates a selected configuration of a fax server during a failed attempt at transmitting a fax image by a fax server. Additionally, a new fax image to be transmitted to a recipient, a specified fax sender, and at least a portion of a phone number is received in the memory of the fax server. Thereafter, a current selected configuration stored for the specified fax sender is retrieved and the database is queried to determine whether the retrieved current selected configuration of the specified fax sender matches a record in the database. On condition that a match is found, it is established that a prior facsimile transmitted by the specified fax sender was unsuccessful, but if no match is found, the fax server transmits the new fax image.

In another embodiment of the invention, a facsimile management system can be provided. The system includes a fax server coupled to a database as well as a fax server module executing in the memory of the fax server. The fax server module includes program code that when executed by a processor of the fax server enables the fax server to respond to a failed attempt at transmitting a fax image by the fax server by writing a record to the database that indicates a selected configuration of the fax server during the failed attempt, receive in a memory of the fax server each of a new fax image to be transmitted to a recipient, a specified fax sender, and also at least a portion of a phone number, and retrieve into the memory of the fax server, a current selected configuration stored for the specified fax sender. The fax server module further includes program code which when executed by the processor of the fax server further enables the fax server to query the database to determine whether the retrieved current selected configuration of the specified fax sender matches a record in the database, and on condition that a match is found, establishes that a prior facsimile transmitted by the specified fax sender was unsuccessful, but on condition that no match is found, transmits the new fax image by the fax server.

In yet another embodiment of the invention, an incoming facsimile number transmitting a fax image by a carrier is monitored. Upon a determination that a threshold failure rate is met or exceeded, the current carrier is changed to a new carrier by changing a record to indicate the new carrier in a database storing records and correlates the carrier to the incoming facsimile number.

Additional aspects of the invention will be set forth in part in the description that follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and, together with the description, serve to explain the principles of the invention. The embodiments illustrated herein are presently preferred; it being understood, however, that the invention is not limited to the precise arrangements and instrumentalities shown, wherein.

DETAILED DESCRIPTION OF THE INVENTION

Embodiments of the invention provide for a facsimile transmission process. In accordance with an embodiment of the invention, a record indicating a selected configuration of a fax server is written to a database for each transmission attempted by the fax server, for only unsuccessful transmissions, or for only successful transmission. The records are then used to determine whether a prior transmission of a fax for a specific fax server had previously failed. If so, the fax is routed to a different fax server supported by different hardware than that of the specified fax server for transmission to the designated fax recipient. Alternatively or additionally, a different selection of fax server configuration settings is applied to the specified fax server than those for the previously failed fax transmission. Yet further, the records may be used in determining whether to change the carrier that is transmitting a transmission. In addition, the carrier upon which the fax is transmitted may be changed, if the carrier is determined problematic. In this way, the likelihood of successfully transmitting the fax to the designated fax recipient can be enhanced.

Figure 1A:
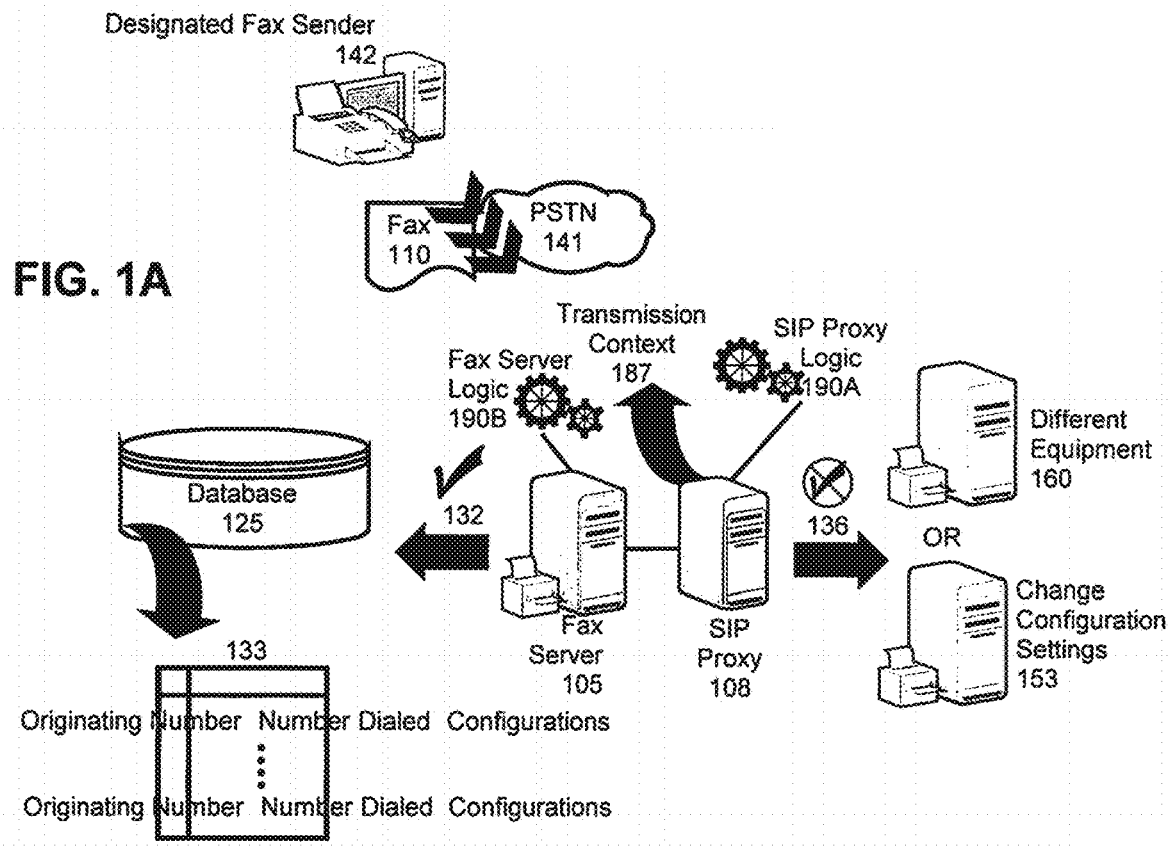
FIGS. 1A, 1B, and 1C are pictorial illustrations of different embodiments of a process for increasing the likelihood of success of a facsimile transmission.

In further illustration, FIG. 1A depicts a process for increasing the likelihood of success of facsimile transmissions. A specified (or designated) fax sender 142 sends a fax (facsimile) 110 via a Public Switched Telephone Network (PSTN) 141 destined for a designated fax recipient. Of note, both the specified fax sender 142 and the designated fax recipient are not limited to a specific device or a specific method for transmitting the fax 110, but includes any device or method that uses a phone line for sending or receiving a fax 110, such as a physical fax machine, computer-based faxing (via a modem), an Internet fax server (via a fax gateway and the Internet), and Fax via Voice over Internet Protocol (VoIP via a VoIP adapter and VoIP gateway). Session Initiation Protocol (SIP) proxy logic 190A on a SIP proxy 108 determines a transmission context 187 for the fax 110 directed to be transmitted by a fax server 105 to a designated fax recipient. The transmission context 187 includes, but is not limited to, the originating phone number or caller ID of the specified fax sender 142 and the phone number dialed (of the designated fax recipient). The transmission context 187 further includes a subset of the originating phone number or number dialed, such as the area code or exchange to a specific number. Further, the transmission context 187 includes either the originating number, the dialed, number, or both.

Upon determining the transmission context 187, SIP proxy logic 190A determines whether a prior facsimile 110 on the same transmission context 187 had been unsuccessfully transmitted 136 by the fax server 105. In an embodiment, SIP proxy logic 190A on the SIP proxy 108 queries a database 125 containing at least one table 133 with multiple, different entries of previous successful transmissions. The SIP proxy logic 190A determines whether the same transmission context 187 is listed in the database 125. If the combination of numbers is listed, then a previous transmission was successful 132. If the combination of numbers is not listed, then the transmission has not yet been successful for that same transmission context 187. In a different embodiment, SIP proxy logic 190A uses just the originating number or just the dialed number in determining the existence of a previous failure. In other words, SIP proxy logic 190A queries the database 125 for only the originating number or only the dialed number; if the number being searched is not found in the database 125, then there was a previous failed transmission for that number. Of note, the table 133 may include the originating number and the dialed number as well as the configuration (settings) related to past successful transmissions. The information related to the settings includes, but is not limited to, the carrier of the transmission (such as Level 3, Verizon, or their regional partners), an identifier indicating a fax board of a successful designated fax recipient, a fax board of a fax server 105, the compression method, the data transmission rate, the error correction mode (ECM), the class, the number of concurrent "calls" allowed, and the stroke speed. Of note, the fax board can be hardware or software. Of further note, in a different embodiment, the table 133 includes data representing unsuccessful attempts. In such an embodiment, SIP proxy logic 190A on the SIP proxy 108 queries the database 125 and if an entry is found, then a prior transmission had been unsuccessful for the specific listed information.

In response to determining that there had been a prior unsuccessful transmission 136 for the facsimile 110 of the same transmission context 187, SIP proxy logic 190A first determines whether different equipment 160 (hardware) is available for selection and, if it is available, SIP proxy logic 190A selects different equipment 160 to transmit the facsimile 110 to the designated fax recipient. In a different embodiment, instead of SIP proxy logic 190A selecting different equipment 160, fax server logic 190B on a fax server 105 changes a configuration 153 of the fax server 105. Of note, the different equipment 160 includes different hardware, such as a different fax board than the (original designated) fax server 105. Subsequent to either changing of the configuration 153 of the fax server 105 or the selection of different equipment 160, the SIP proxy logic 190A makes a new attempt at transmitting the facsimile 110 to the fax server 105. Upon the successful transmission 132 of the fax 110 via either different equipment 160 or different configurations, the database 125 (or more specifically, the table 133), is updated with data related to the successful transmission, including transmission context 187, such as the originating number and the number of the receiving device. Any other information related to the configuration, including but not limited to, the carrier, an identifier indicating the fax board used, the compression method, the data transmission rate, the error correction mode, the class, the number of allowed concurrent "calls," and the stroke speed is also updated. More specifically, the SIP proxy logic 190A, which determines which fax server to utilize, updates the database 125 with respect to information related to a specific fax server on which a successful transmission 132 occurred, and fax server logic 190B, which determines settings (which configurations can be changed and how the configurations are changed) updates the database with respect to changed configurations for successful transmissions 132.

In further explanation of changing a configuration 153 of the fax server 105 upon the determination of a previous unsuccessful transmission 136, the fax server logic 190B determines which settings to modify based upon previous successful transmissions. In an embodiment, the fax server logic 190B queries the database 125 to identify a carrier the fax 110 was transmitted on as well as configurations, including but not limited to, the compression method, the data transmission rate, the error correction mode (ECM), the class, the number of concurrent "calls" allowed, and the stroke speed options, which can be adjusted. Upon the selection of at least one setting to be adjusted, the fax server logic 190B can change the setting(s). A new attempt (a new call) to transmit the fax 110 is then made. Upon the successful transmission of the fax 110, the database 125, and more specifically, at least one table 133, is updated with the successful configuration along with the corresponding transmission context 187. In this way, the database 125 accumulates the success data, which is used for subsequent transmissions and devices. In a different embodiment, the database 125 accumulates data resulting from failed transmissions.

Figure 1B:
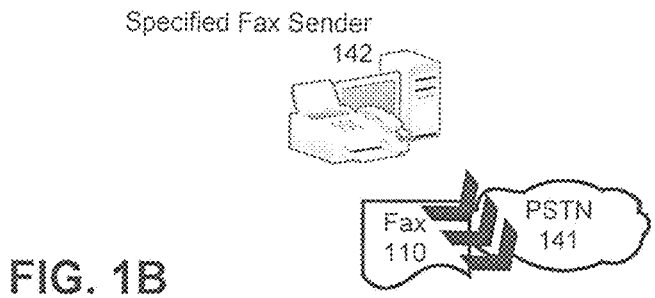

Of note, FIG. 1B illustrates a different embodiment of the invention where the logic comprising the SIP proxy logic 190A is incorporated with fax server logic 190B on a fax server 105. In other words, the process described using FIG. 1A is achieved without an SIP proxy 108, as shown in FIG. 1B. As such, the steps performed by the SIP proxy logic 190A are performed by logic on the fax server 105. In particular, some or all of the program code corresponding to the SIP proxy logic 190A is incorporated within the fax server logic 190B on the fax server 105 and is separate from the fax server logic 190B but is still located on the fax server 105, or on a separate computing device (not on the fax server 105).

Regardless of how some or all of the program code corresponding to the SIP proxy logic 190A is incorporated within the fax server logic 190B, in one embodiment, as shown in FIG. 1B, in response to a specified fax sender 142 sending a fax (facsimile) 110 via a Public Switched Telephone Network (PSTN) 141 destined for a designated fax recipient, fax server logic 190B on one fax server 105A of a set of fax servers arranged to handle facsimile calls in a "round robin" set up determines that the fax server 105A is not suitable to handle the incoming fax 110. Thereafter, the fax server logic 190B of the fax server 105A rejects the incoming fax, resulting in the fax 110 going to a different fax server 105B, 105C, 105D. The corresponding fax server logic 190B on each different fax server 105B, 105C, 105D then determines, based on previous experience, whether the specific fax server 105B, 105C, 105D is suitable to receive the fax 110. This process repeats until a suitable fax server 105B, 105C, 105D is determined. It should be understood that though only four fax servers are shown, there can be more or fewer. Of note, in a different embodiment of the invention, instead of outright rejecting the fax 110, the fax server logic 190B of a specific fax server 105A, 105B, 105C, 105D based on prior experience may change one or more configurations of the fax server 105A, 105B, 105C, 105D, including but not limited to speed, whether error correction mode (ECM) is on or off, number of concurrent calls, etc.

Of note, whether or not a fax server 105A, 105B, 105C, 105D is deemed a suitable device to handle the fax 110 (whether to reject the fax 110) is determined based on previous experience with call origination or destination. Similarly, as described in connection with FIG. 1A, where the SIP proxy logic 190A on the SIP proxy 108 determined whether a prior facsimile 110 with the same transmission context 187 had been unsuccessfully transmitted 136 by the fax server 105, fax server logic 190B on any one of fax servers 105A, 105B, 105C, 105D queries a database 125 containing at least one table 133 with multiple, different entries of previous successful transmissions. The fax server logic 190B determines whether the same transmission context 187 is listed in the database 125. If the combination of numbers is listed, then a previous transmission was successful 132. If the combination of numbers is not listed, then the transmission has not yet been successful for that same transmission context 187. In a different embodiment, fax server logic 190B uses just the originating number or the dialed number to determine the existence of a previous failure. In other words, fax server logic 190B queries the database 125 for just the originating number or just the dialed number; if the number being searched is not found in the database 125, then there was a previous failed transmission for that number. Of note, the table 133 includes the originating number and the dialed number as well as the configuration settings related to past successful transmissions.

Of note, in a different embodiment, related to determining whether there was a previous failed transmission, the database 125 contains a table 133 of multiple, different entries of previous unsuccessful transmissions. In such an embodiment, fax server logic 190B queries the database 125 for just the originating number or just the dialed number; if the number being searched is found in the database 125, then there was a previous failed transmission for that number. In yet a different embodiment, the database 125 contains multiple different tables 133, including one listing multiple, different entries of previous successful transmissions and a different table storing multiple, different entries of previous unsuccessful transmissions. Alternatively, there may be multiple databases (not shown), including one database storing transmission data related to previous successful transmissions and a different database storing transmission data related to previous unsuccessful transmissions.

In yet another embodiment of the invention related to determining whether or not a prior transmission was or was not successful, fax server logic 190B determines the current configurations of a specified fax sender 142 by loading a database 125 storing the current configurations of the specified fax sender 142 and querying the database 125 to obtain the current configurations of the specified fax sender 142. Of note, the database listing the current configurations of the specified fax sender 142 can be the same database storing previous successful transmissions or previous unsuccessful transmissions or a different, separate database, which is not pictured. The current configurations of the designated fax server 142 along with the originating number and/or the dialed number is used by fax server logic 190B to query a database 125 listing unsuccessful transmission data, in one embodiment, or a database 125 listing successful transmission data, in a different embodiment, to determine if a prior transmission was unsuccessful or successful. More specifically, if there is a match, i.e. the same entries are found, between (1) the originating number (and/or the dialed number) and the determined current configurations of the specified fax sender 142 and (2) the originating number (and/or the dialed number) and corresponding previously selected configurations, a determination can be made as to the success or failure of a prior transmission. A determination that a prior transmission was unsuccessful occurs either when there is no listing, i.e. no match, in a database 125 storing successful transmission data, or there is a listing, i.e. a match, in a database 125 listing unsuccessful transmission data. Likewise, a determination that a prior transmission was successful occurs either when there is listing, i.e. a match, in a database 125 storing successful transmission data, or there is a no listing, i.e. no match, in a database 125 listing unsuccessful transmission data.

In yet a different embodiment, fax server logic 190B on a fax server 105A, 105B, 105C, 105D receives, in the memory of the fax server 105A, 105B, 105C, 105D, each of a new fax image (fax 110) to be transmitted to a recipient, a specified fax sender 142, and also at least a portion of a phone number, prior to a specified fax sender 142 transmitting a fax 110. The fax server logic 190B then retrieves a current selected configuration stored for the specified fax sender from a database 125 storing records indicating a selected configuration of a fax server 105A, 105B, 105C, 105D into the memory of the fax server 105A, 105B, 105C, 105D, using in one embodiment, the received specified fax sender 142, or in a different embodiment, the portion of the received phone number. Of note, in one embodiment, the portion of the received phone number includes at least a portion of an originating phone number of the specified fax sender 142, e.g. area code, central office code (the second part, the "456" of a 10 digit U.S. phone number, 123-456-7890), etc. In a different embodiment, the portion of the phone number can include a portion of a destination phone number of the (fax) recipient. Of further note, as indicated herein, the database 125 can store (1) transmission data related to a failed attempt at transmitting a fax image, including a selected configuration of the fax server 105A, 105B, 105C, 105D, (2) transmission data related to a successfully transmitted fax (fax image) 110, or (3) transmission data related to both successfully and unsuccessful transmissions. Thereafter, in an embodiment where the database 125 indicates selected configurations of the fax server 105A, 105B, 105C, 105D during a failed transmission attempt, the database is queried to determine whether the retrieved current selected configuration of the specified fax sender 142 matches a record in the database 125. On condition that a match is found, fax server logic 190B establishes that a prior facsimile transmitted by the specified fax sender 142 was unsuccessful, but on condition that no match is found, fax server logic 190B transmits the new fax image 110 by the fax server 105A, 105B, 105C, 105D. In this way, transmission data stored in the database 125 can be used to predict the likelihood of a success or a failure in transmitting a fax 110.

Figure 1C:
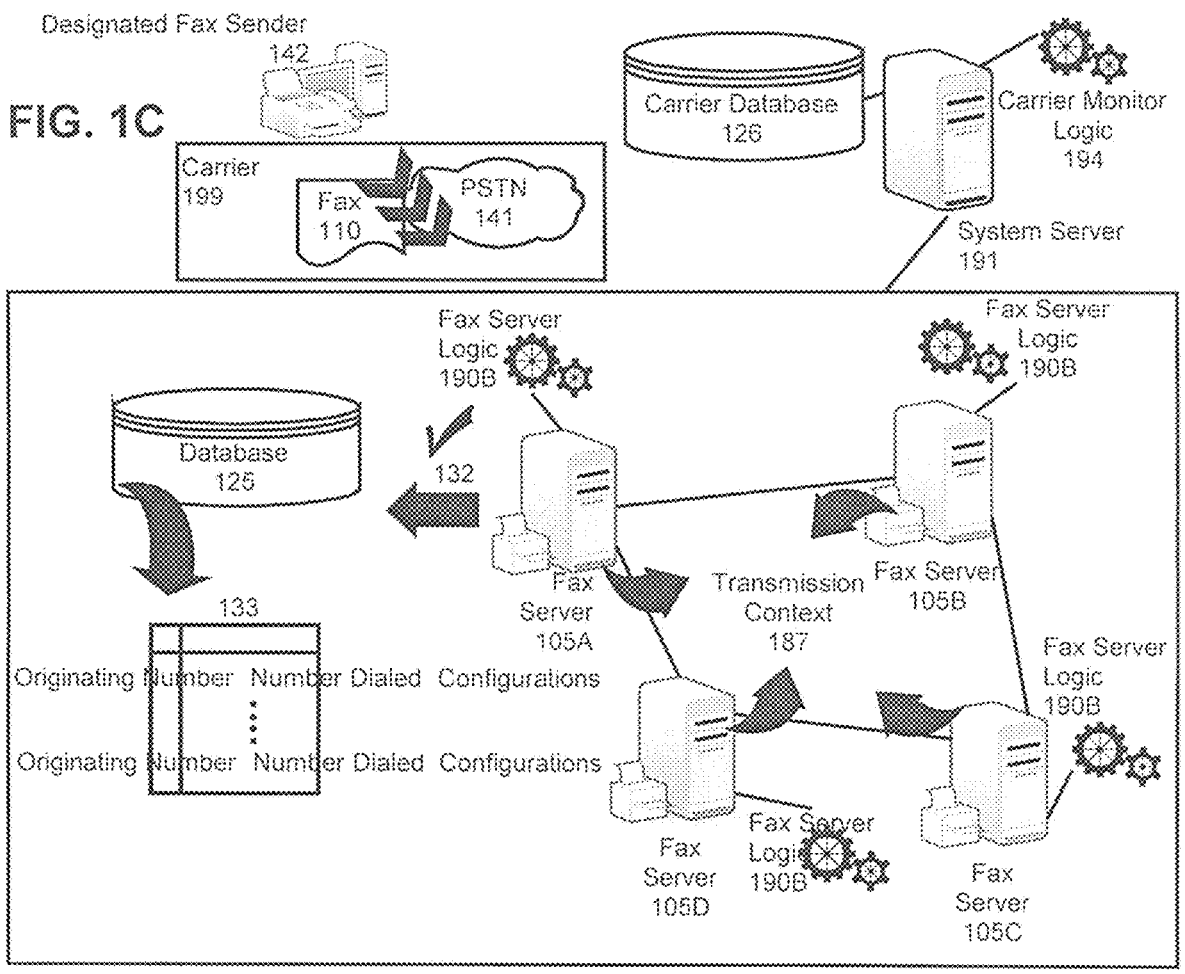

In further illustration, FIG. 1C depicts a process for increasing the likelihood of success of facsimile transmissions by changing the carrier 199 of a fax 110. In other words, instead of (or in addition to) changing one or more configurations of the fax server 105 (FIG. 1A) or 105A, 105B, 105C, and 105D (FIG. 1B), the carrier 199 transmitting the fax 110 is adjusted following a determination that the carrier 199 is problematic. More specifically, regardless of how the fax servers 105, 105A, 105B, 105C, 105D are configured and regardless of whether a SIP Proxy 108 is present, carrier monitor logic 194 on a system server 191 monitors fax transmission traffic from one or more designated fax senders 142. In particular, carrier monitor logic 194 monitors one or more incoming fax numbers upon which faxes 110 are transmitted to determine whether a threshold failure rate is met (or exceeded). In an embodiment, the carrier monitor logic 194 continuously monitors one or more incoming fax numbers, or in a different embodiment, carrier monitor logic 194 monitors according to a schedule (event scheduling).

Regardless of how the monitoring is accomplished, carrier monitor logic 194 determines whether or not a threshold failure rate is met. In one embodiment, carrier monitor logic 194 determines, for a particular fax number, whether or not a statistically lower percentage of successful transmissions have occurred (or a higher percentage of unsuccessful transmissions have occurred). In particular, determining whether or not a threshold failure rate (or threshold success rate) is at least met based upon a successful transmissions is accomplished by carrier monitor logic 194 obtaining (by querying the database 125) and analyzing the information captured by fax server logic 190B. In other words, carrier monitor logic 194 works in conjunction with fax server logic 190B (and/or SIP proxy logic 190A) to obtain information stored in the database 125 related to the success and/or failure of particular transmissions in order for carrier monitor logic 301 to determine whether or not the threshold failure rate has been met. Of note, what is statistically relevant varies between systems and, thus, is not a specific value.

In a different embodiment, determining whether a threshold failure rate is met is dependant on determining for a particular fax number whether or not a statistically lower percentage of (transmissions/calls) faxes 110 have been received. In other words, carrier monitor logic 194 analyzes the number of transmissions received (or not received) to determine whether a threshold failure rate is met. If there is a drop off of the number of faxes 110 received compared to what is typically received, which, in one embodiment, is determined by averaging the number of faxes 110 over one or more time periods. For example, if over a one hour period, one hundred transmissions are typically received from 12 p.m. to 1 p.m., but carrier monitor logic 194 determines only ten (10) faxes 110 have been received so far at 12:30 p.m., then a determination is made by carrier monitor logic 194 that the carrier currently transmitting the faxes 110 is problematic (i.e. meets the threshold failure rate).

Of note, instead of just analyzing one incoming fax number receiving a number (or percentage) of faxes 110, carrier monitor logic 194 may instead (or in addition to) analyze the number of (calls/transmissions) faxes 110 received on any incoming fax number being utilized by the same carrier. In other words, carrier monitor logic 194 can use data from one or more incoming fax numbers in determining whether a threshold failure rate is met.

Once carrier monitor logic 194 has determined the threshold failure rate has not been met, carrier monitor logic 194 makes no change to the carrier 199, as the carrier 199 is determined not to be problematic. However, if a determination is made that the threshold failure rate is met (indicating a problematic carrier), then carrier monitor logic 194 changes the carrier 199 currently associated with the incoming fax number transmitting the fax 110. Of note, if a fax 110 is currently being transmitted on the carrier 199, the carrier 199 may still be adjusted; however, the transmission will be completed on the current carrier 199 and any new transmissions will be on the new carrier 199. In one embodiment, the carrier monitor logic 194 changes the carrier 199 associated with the incoming fax number transmitting a fax 110 by changing a database entry in the carrier database 126 to point to a different carrier 199 corresponding to the incoming fax number transmitting the fax 110.

Once the carrier 199 has been changed, carrier monitor logic 194 updates the carrier database 126 containing the data correlating incoming fax numbers with one or more carriers 199 to show the current carrier 199. The carrier information is further forwarded to the fax server 105, 105A, 105B, 105C, 105D, so the selected carrier 199 can be added to the database 125 containing information related to successful and/or unsuccessful fax transmissions. In this way, changes to a carrier 199 in addition to changes to the fax server 105, 105A, 105B, 105C, 105D are utilized to increase the likelihood of a successful fax transmission.

Of note, it should be understood that carrier monitor logic 194 can determine whether or not a specific success rate has or has not been made instead of determining whether a threshold failure rate has been met (or exceeded). In other words, if the carrier monitor logic 194 determines that a threshold success rate is met (or exceeded), then there would be no change to the carrier 199. Consequently, if carrier monitor logic 194 determines that a threshold success rate is not met, then the carrier 199 would be changed, as it would be determined that the carrier 199 is problematic. Thereafter, as indicated herein, the carrier database 126 would be updated with the new carrier information and the carrier information would be forwarded to the fax server 105, 105A, 105B, 105C, 105D for incorporation into the database 125 storing the successful and/or unsuccessful fax transmission information.

Figure 2A:
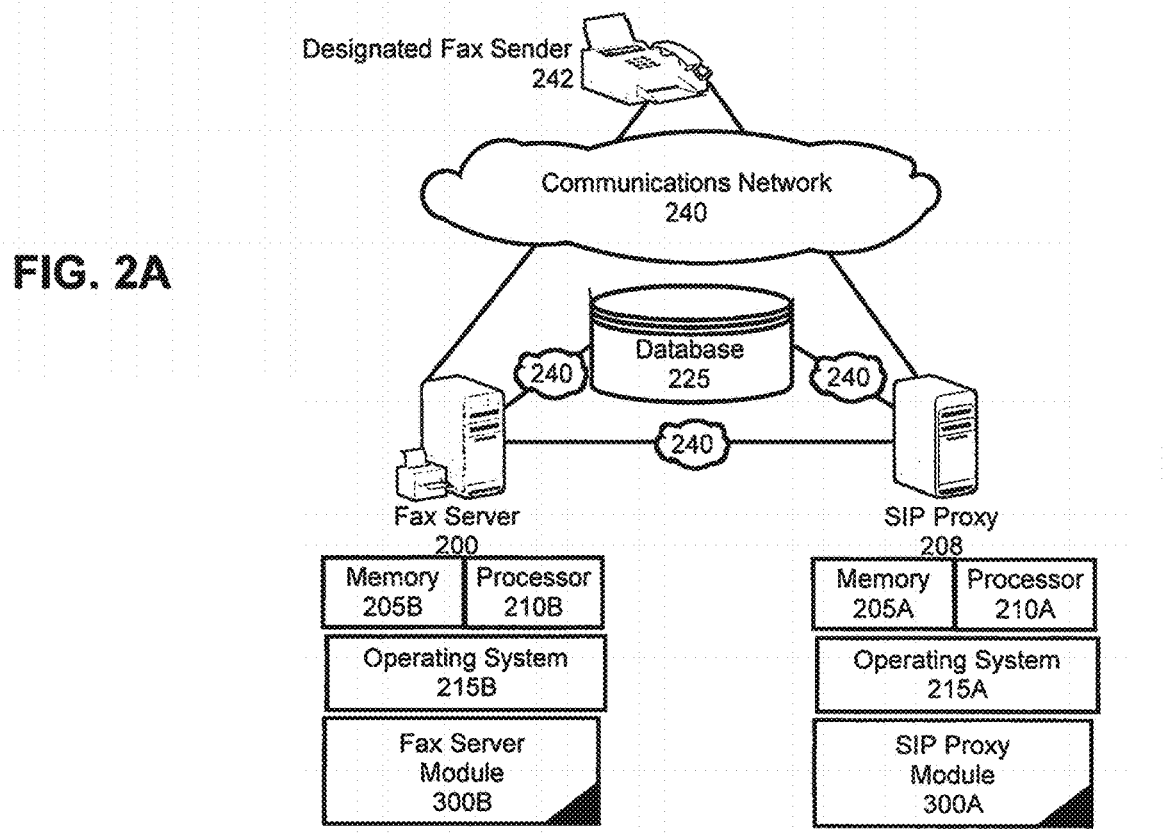
FIGS. 2A, 2B, and 2C are schematic illustrations of different embodiments of a facsimile management system configured for increasing the likelihood of success of a facsimile transmission; and, FIGS. 3A, 3B, 3C, and 3D are flow charts illustrating different embodiments for a process for increasing the likelihood of success of a facsimile transmission.
Figure 2B:
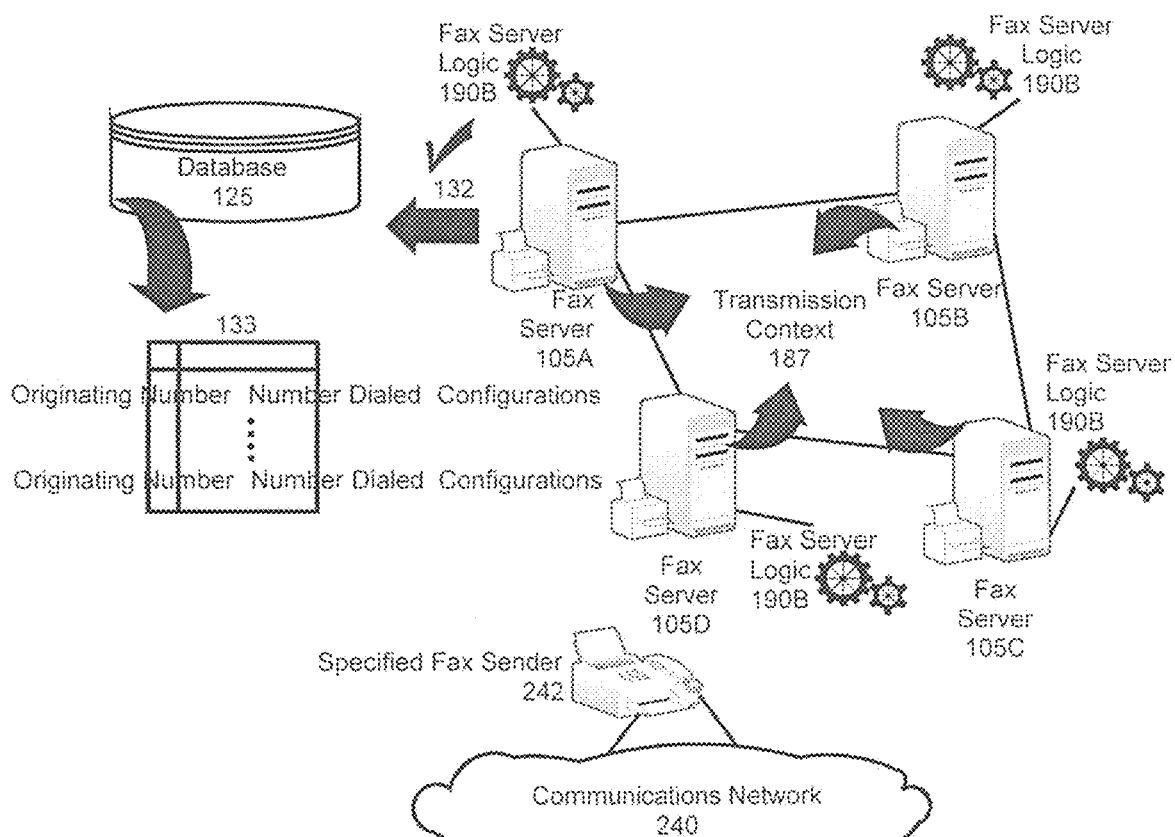
Figure 2B:
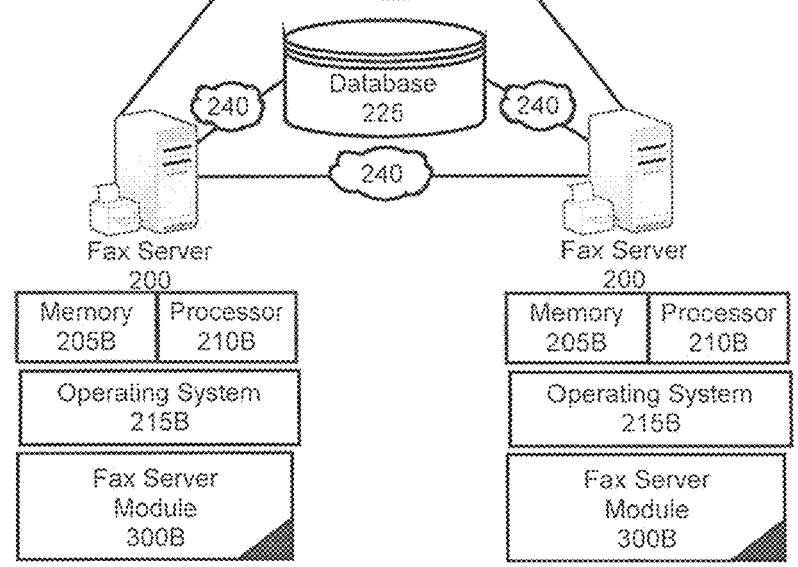
Figure 2C:
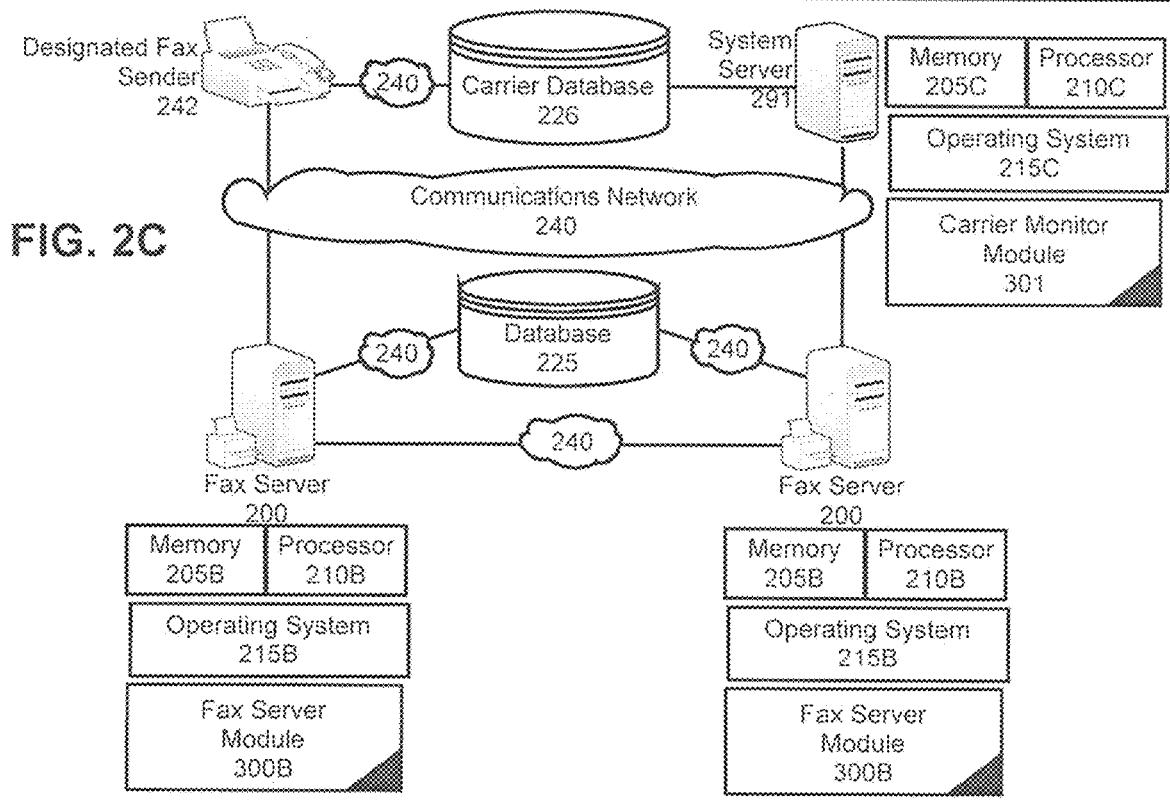

The process described in connection with FIGS. 1A, 1B, and 1C can be implemented in a facsimile management system. In further illustration, FIGS. 2A, 2B, and 2C schematically show a facsimile management system configured for increasing the likelihood of success of a facsimile transmission. With respect to FIG. 2A, the facsimile management system includes a specified fax sender 242 and a database 225 each coupled to a fax server 200 and also a SIP proxy 208 via a communications network 240. The fax server 200 includes at least one processor 210B and memory 205B supporting the execution of an operating system 215B. The operating system 215B, in turn, supports a fax server module 300B. The SIP proxy 208 is hosted by a computer that includes at least one processor 210A and memory 205A supporting the execution of an operating system 215A. The operating system 215A, in turn, supports a SIP proxy module 300A.

The SIP proxy module 300A includes program code, which, when executed by at least one processor 210A of the SIP proxy 208, determines a transmission context for a received facsimile directed to be transmitted by a fax server 200 to a designated fax recipient. Upon the determination of the transmission context, the program code of the SIP proxy module 300A determines whether a prior facsimile of the same (determined) transmission context had been unsuccessfully transmitted by the fax server 200. In other words, the program code of the SIP proxy module 300A determines whether a failed transmission has previously occurred for the same combination of numbers (originating and destination) or for just one of the numbers, such as, just the originating number or just the destination number. In a different embodiment, the SIP proxy module 300A determines whether a failed transmission has or has not previously occurred by comparing (1) previously selected configurations of a specified fax sender 242 in combination with any of a portion of an originating number, a portion of a destination number, or portions of both originating and destination numbers for a previously transmitted fax with (2) the current selected configurations of a designated fax server 242 and any portion of an originating number, a portion of a destination number, or portions of both originating and destination numbers for a fax to be transmitted to determine whether there is a match. A determination that a prior transmission was unsuccessful occurs either when there is no listing, i.e. no match, in a database 225 storing successful transmission data (at least a portion of a originating phone number and/or a destination phone number, hardware information, and/or configuration settings) or there is a listing, i.e. a match, in a database 225 listing unsuccessful transmission data. Likewise, a determination that a prior transmission was successful occurs either when there is listing, i.e. a match, in a database 225 storing successful transmission data, or there is a no listing, i.e. no match, in a database 225 listing unsuccessful transmission data.

In response to determining that there had been a prior unsuccessful transmission for the received (incoming) facsimile of the same transmission context, the program code of the SIP proxy module 300A determines whether different equipment (hardware) is available. In one embodiment, whether different equipment is available is determined by querying the database 225, which, in part, includes a list of available hardware. In another embodiment, the database containing the information related to the list of available hardware may be a different database then the one containing information related to successful (or unsuccessful) facsimile transmissions. Yet further, the list of available hardware may not be stored on a database 225, but instead stored in memory on the SIP proxy 208 (or really, the computer upon which the SIP proxy 208 operates), such as in a look-up table.

Upon determining that different equipment is available, one of the different equipment options is selected. The database 225 is then updated to reflect the different equipment selected, and a new attempt to transmit the facsimile is made (and the process repeated if the transmission is again unsuccessful). Further, the program code of the SIP proxy module 300A updates the database 225 once it has been determined that the new attempt (with the new equipment) has been successful. Of note, in a different embodiment, the program code of the SIP proxy module 300A updates the database 225 when the transmission is unsuccessful. Notwithstanding, if it is determined that different equipment is unavailable (after determining that there had been a prior unsuccessful transmission for the facsimile of the same transmission context), then the program code of the fax server module 300B determines whether to change the settings of the fax server 200. It should be understood that writing a record to a database (the updating of the database) can occur at any point in the process whether as a last step, as a first step, or any point in between.

In an embodiment, in which the program code of the fax server module 300B changes a configuration of the fax server 200, the program code of the fax server module 300B determines which setting (configuration) to change and to what by querying the database 225 in which a history of successful transmissions is recorded. The database 225 includes information related to the originating number, the number dialed, a subset of both or one (such as the area code), as well as the configurations of previous successful transmissions. Once a new configuration has been selected and updated, the fax server module 300B makes a new call in order to attempt to transmit the facsimile transmission with the new configuration. In other words, a new attempt to transmit the facsimile is made subsequent to the changing of the configuration of the fax server 200. Thereafter, if the transmission is successful, the program code of the SIP proxy module 300A updates the database 225 to indicate a successful transmission of the facsimile. In this way, the database 225 accumulates the success data, which can be used for subsequent call settings and devices. In a different embodiment, the database 225 is updated when there is an unsuccessful transmission. More specifically, the database 225 is updated with information related to the originating number, receiving device (such as the phone number or other identifier), and settings (including, but not limited to, information related to the carrier, the fax board, the compression method, the data transmission rate, the error correction mode, the number of concurrent calls allowed, the class, and stroke speed options) of the successful or unsuccessful transmission. It should be understood that writing a record to a database 225 (the updating of the database 225), occurs at any point whether as the last step, as a first step, or any point in between.

Yet further, though not illustrated, it should be understood by one skilled in the art that instead of only one database 225 there can be multiple databases: one database 225 storing multiple, different entries of previous successful transmissions, which can include corresponding transmission data, such as, but not limited to, transmission context, hardware information, and/or configuration settings, and there can be a different database 225 storing unsuccessful transmission data, such as, but not limited to, transmission context, hardware information, and/or configuration settings.

Of note, it should be understood that instead of the program code of the SIP proxy module 300A determining whether a previous failure had occurred, the program code of the fax server module 300B could determine such. Thereafter, the program code of the fax server module 300B would then determine whether to change settings of the fax server 200. If a determination was made that there were no configuration setting changes available, then the program code of the SIP proxy module 300A would determine whether to change equipment. In other words, the disclosed invention is not limited to first determining whether different equipment is available and making that change prior to attempting to change the configuration of a specific fax server. More specifically, the program code of the fax server module 300B or the SIP proxy module 300A, in response to determining that there had been a prior unsuccessful transmission for the facsimile of the same transmission context, changes a configuration of the fax server 200 or selects different equipment, respectively, in an attempt to successfully transmit the facsimile to a fax recipient.

Of note, FIGS. 2B and 2C illustrate a different embodiment of a facsimile management system configured for increasing the likelihood of success of a facsimile transmission where there is no SIP proxy. Instead, the computer programming code (or logic), in one embodiment, comprising the SIP proxy module, can be incorporated with the fax server module 300B on a fax server 200. In other words, the system described in relation to FIG. 2A may be achieved without a SIP proxy, as shown in FIGS. 2B and 2C.

More specifically, in FIGS. 2B and 2C, the facsimile management system can include a specified fax sender 242 and a database 225, each coupled to one fax server 200 of a set of fax servers (though only two fax servers are illustrated, more can be included) via a communications network 240. Of note, it should be understood that though there is only one database 225 pictured, there can be more than one database 225. Each fax server 200 includes at least one processor 210B and memory 205B supporting the executing of an operating system 215B. The operating system 215B, in turn, supports a fax server module 300B. Additionally, in one embodiment, the different fax servers 200 are configured "round-robin" style. As such, the program code of the fax server module 300B of a first fax server 200 determines whether or not the corresponding fax server 200 is suitable to handle an incoming fax. If it is determined that the first fax server 200 is not suitable to handle the incoming fax, the program code of the fax server module 300B of the fax server 200 rejects the incoming fax resulting in the fax going to a different fax server. Thereafter, the corresponding program code of the fax server module 300B on the different fax server 200 determines, based on previous experience, whether the different fax server 200 is suitable to receive the fax 110. This process repeats until a suitable fax server 200 is determined. It should be understood that though only two fax servers 200 are illustrated in FIG. 2B, there can be more or fewer. Of note, in a different embodiment of the invention, instead of outright rejecting the fax, the program code of the fax server module 300B of a specific fax server 200, based on previous experience with call origination and/or call destination, changes one or more configurations of the fax server 200 including but not limited to speed, whether error correction mode (ECM) is on or off, number of concurrent calls, etc.

Of note, whether or not a fax server 200 is deemed a suitable device to handle the fax is determined based on previous experience with call origination and/or call destination. More specifically, the program code of the fax server module 300B, determines the transmission context of the incoming fax. The transmission context is then used to search a database 225 storing multiple, different entries of previous successful transmissions and corresponding transmission data (such as, transmission context, hardware information, and/or configuration settings) to determine if a previous failure occurred.

Whether a previous failure occurred is determined, in one embodiment, by checking whether the combination of numbers is listed (part of the transmission context) in the database 225 storing previous successful transmissions; if the numbers are listed, then a previous transmission was successful. If the combination of numbers is not listed in the database 225, then the transmission has not yet been successful for that same transmission context. In a different embodiment, the program code of the fax server module 300B uses just the originating number or just the dialed number (destination number) in determining the existence of a previous failure. In other words, the program code of the fax server module 300B queries the database 225 storing previous successful transmissions for just the originating number or just the dialed number. If the number being searched is not found in the database 225 storing previous successful transmissions, then there was a previous failed transmission for that number. In a different embodiment, the database 225 stores multiple, different entries of unsuccessful transmission data (such as, transmission context, hardware information, and/or configuration settings). In such an embodiment, finding an entry in database 225 storing unsuccessful transmission data indicates an unsuccessful transmission, whereas not finding an entry for a particular transmission context indicates a successful transmission. In other words, it should be understood that the program code of the fax server module 300B queries either a database 225 storing previous successful transmission data or a database 225 listing previous unsuccessful transmission. In addition, it should be understood that any of the originating number or portion thereof, the dialed number or portion thereof, both the originating number and dialed (destination) number or portions thereof, as well as configurations of a specified fax sender 242 can be used in determining whether a prior transmission was successful or unsuccessful. Additionally, it should be understood, there can be a single database 225 that includes multiple different tables, including a table listing successful transmission data, a different table storing unsuccessful transmission data, and another table storing the current settings (configurations) of any specified fax sender 242 and/or designated fax recipient or multiple, different databases 225, each storing this information.

Regardless of which type of table or database is searched, as described above, if it is determined that a previous failure has not occurred for specific settings based on the transmission context, the program code of the fax server module 300B proceeds with the transmission of the fax. However, if the program code of the fax server module 300B determines that a previous failure for the specific settings has occurred, then the program code of the fax server module 300B either forwards the incoming fax to a different fax server 200 or updates the settings of the current fax server 200 to one or more settings that were previously successful for the transmission context. Once a successful transmission has occurred, the transmission data is saved in the database 225. In this way, the database accumulates the success data, which is used for subsequent transmissions and devices. In an alternate or additional embodiment, when there is an unsuccessful transmission, the transmission data is saved in the database 225. In either embodiment, the historical data is used to increase the likelihood of successful facsimile transmissions.

Of note, in yet a different embodiment of the facsimile management system, the program code of the fax server module 300B of a first fax server 200 of FIG. 2B writes a record to a database 225 that indicates a selected configuration of a fax server 200 during a failed attempt at transmitting a fax image (or just fax). Thereafter, the program code of the fax server module 300B receives, in a memory 205B of the fax server 200, a new fax image to be transmitted to a recipient, a specified fax sender 242, which includes, but is not limited to, a media access control (MAC) address for the specified fax sender 242, the name of the specified fax sender 242, and a portion of a phone number associated with the specified fax sender 242, and also at least a portion of a phone number, such as a destination phone number of the (fax) recipient or an origination phone number of the specified fax server 242. A current selected configuration stored for the specified fax sender 242 is retrieved from the database 225 into the memory 205B of the fax server 200. Thereafter, the program code of the fax server module 300B queries the database 225 to determine whether the retrieved current selected configuration of the specified fax sender 242 matches a record in the database 225. The program code of the fax server module 300B then establishes that a prior facsimile transmitted by the specified fax sender 242 was unsuccessful on condition that a match is found, but on the condition that no match is found, the program code of the fax server module 300B transmits the new fax image by the fax server 200 to the designated fax recipient. In other words, if there is no match found, a previous transmission was successful for the specified fax sender 242, so the transmission is attempted, but if a match is found (in the database indicating configurations during failed attempts), a previous failure has occurred.

Additionally, the program code of the fax server module 300B determines whether to change the configurations of the fax server 200. Further, the program code of the fax server module 300B transfers the new fax image to a second fax server 200 in response to determining not to change the configurations of the (the first) fax server 200 or change one or more configuration of the fax server 200 in response to determining to change the configurations of the fax server 200. Of note, it should be understood that the facsimile management system illustrated in FIG. 2B can include more than one database 225, where, for example, (1) one database 225 indicates transmission data, including a selected configuration of a fax server 200, during a failed transmission attempt, (2) a different database 225 includes transmission data, indicating a selected configuration of a fax server 200, for a successful transmission attempt and/or (3) a database 225 containing multiple, different tables capturing transmission data related to both successful and unsuccessful transmissions.

Unlike FIGS. 2A and 2B, FIG. 2C additionally includes a system server 291 coupled to a carrier database 226 storing records correlating a carrier to an incoming facsimile number, which is further coupled to the rest of the facsimile management system (a designated fax sender 242, one or more fax servers 200, one or more databases 225, and/or one or more SIP proxy servers (not pictured)) via a communications network 240. The system server 291 includes at least one processor 210C and memory 205C supporting the executing of an operating system 215C. The operating system 215C, in turn, supports a carrier monitor module 301. In this way, the program code of the carrier monitor module 301 enables a carrier upon which a fax is transmitted to be changed after the carrier is determined problematic (determined to met or exceed a threshold failure rate or fall below a threshold success rate), thus increasing the likelihood of a successful fax transmission, which is further increased by changing various settings of the fax server by the fax server module 300B or the SIP proxy module 300A.

In particular, while the program code of the fax server module 300B and/or the SIP proxy module 300A processes information the program code of the carrier monitor module 301 monitors one or more incoming fax numbers upon which a fax is being transmitted from a designated fax sender 242. Of note, in one embodiment, the carrier monitor module 301 is implemented as an application program interface (API). As indicated herein, the program code of the carrier monitor module 301 monitors one or more incoming fax numbers upon which faxes are transmitted to determine whether a threshold failure rate is met or exceed (or, in an alternate embodiment, whether a threshold success rate is not exceeded). In an embodiment, the program code of the carrier monitor module 301 continuously monitors one or more incoming fax numbers or monitors the one or more incoming fax numbers as dictated by a scheduled event.

Regardless of how the monitoring is accomplished, the program code of the carrier monitor module 301 determines whether or not a threshold failure rate is met (or in a different embodiment, whether a threshold success rate is not met). In one embodiment, the program code of the carrier monitor module 301 determines, for a particular fax number, whether or not a statistically lower percentage of successful transmissions have occurred or a higher percentage of unsuccessful transmissions have occurred. More specifically, the program code of the carrier monitor module 301 works in conjunction with fax server logic 300B to obtain information stored in the database 125 related to the success and/or failure of particular transmissions in order for carrier monitor logic 301 to determine whether or not the threshold failure rate has been met. Of note, what is statistically relevant varies between systems and, thus, is not a specific value. Additionally, the program code of the carrier monitor module 301 may determine the average and/or the total number of successful and/or unsuccessful transmissions (faxes) of one or more incoming fax numbers in determining whether determining a threshold failure rate is met or a threshold success rate is not met.

In a different embodiment, the program code of the carrier monitor module 301 determines whether a threshold failure rate occurs by determining for a particular fax number whether or not a statistically lower percentage of faxes (transmissions/calls) have been received. In other words, the program code of the carrier monitor module 301 determines if the number of calls (faxes/transmission) has declined compared to what the average may be, usually over a specific time frame. In yet a different embodiment, the program code of the carrier monitor module 301 may instead (or in addition to) analyze the number of (calls/transmissions) faxes received on any incoming fax number being utilized by the same carrier. In other words, the program code of the carrier monitor module 301 may use data from one or more incoming fax numbers in determining whether a threshold failure rate is met or a threshold success rate is not met. Thus, the program code of the carrier monitor module 301 may analyze the average and/or the total number of incoming faxes (transmissions) of one or more incoming fax numbers in order to determine if a threshold failure rate is met or a threshold success rate is not met.

If a threshold failure rate is not met, then no change to the current carrier is made. However, upon a threshold failure rate is determined met by the program code of the carrier monitor module 301, the program code of the carrier monitor module 301 may then change the current carrier to a new carrier. In one embodiment, the program code of the carrier monitor module 301 first determines what the new carrier should be based upon a preference assigned to different carriers with the carrier with the highest preference being selected (usually the carrier with the lowest preference number), then the program code of the carrier monitor module 301 adjusts the new carrier by changing a database entry in a carrier database 226 to point to the selected different carrier. Of note, the carrier database 226 includes records correlating an incoming fax number to a carrier responsible for transmitting a fax image. After the carrier has been changed resulting in the carrier database 226 being updated, the information regarding the carrier is sent via the communications network 240 to the fax server 200. Thereafter, the new carrier information is added to the database 225, which stores information related to successful and/or unsuccessful transmissions. In this way, information related to the carrier as well as the fax server 200 is used to increase the likelihood of success of facsimile transmissions.

Figure 3A:
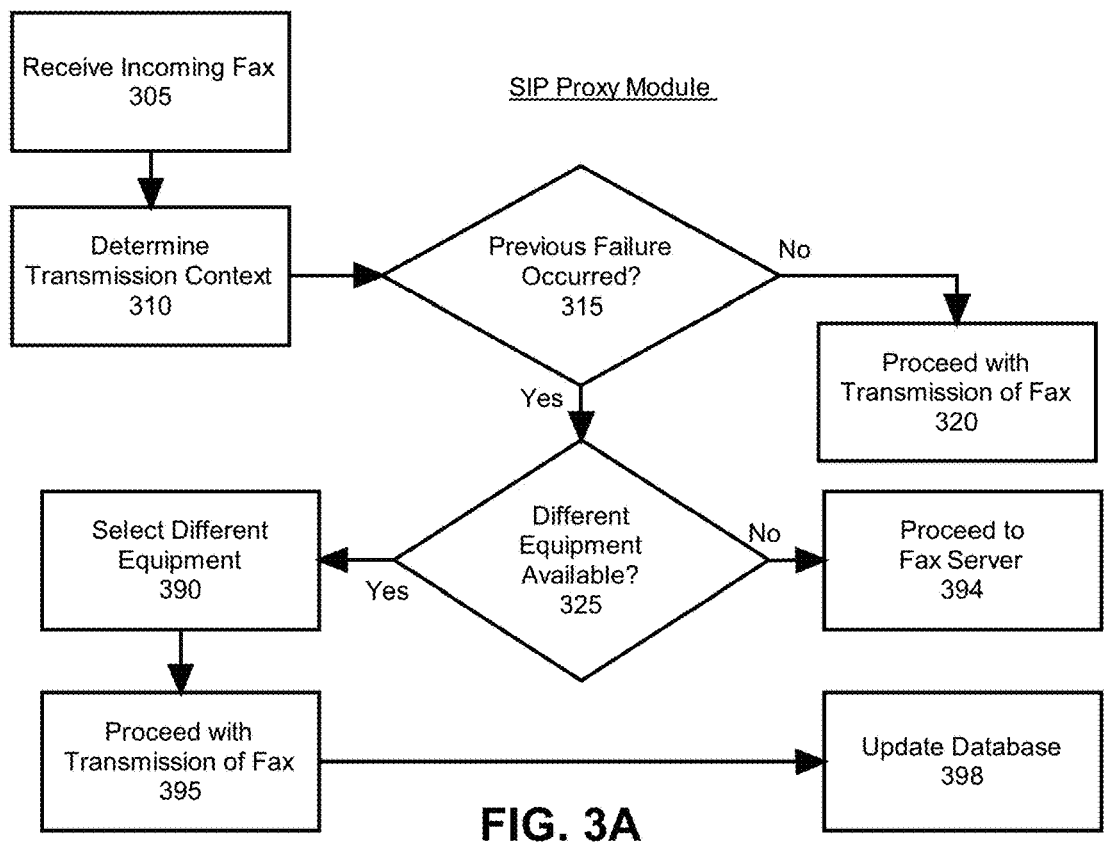
Figure 3B:
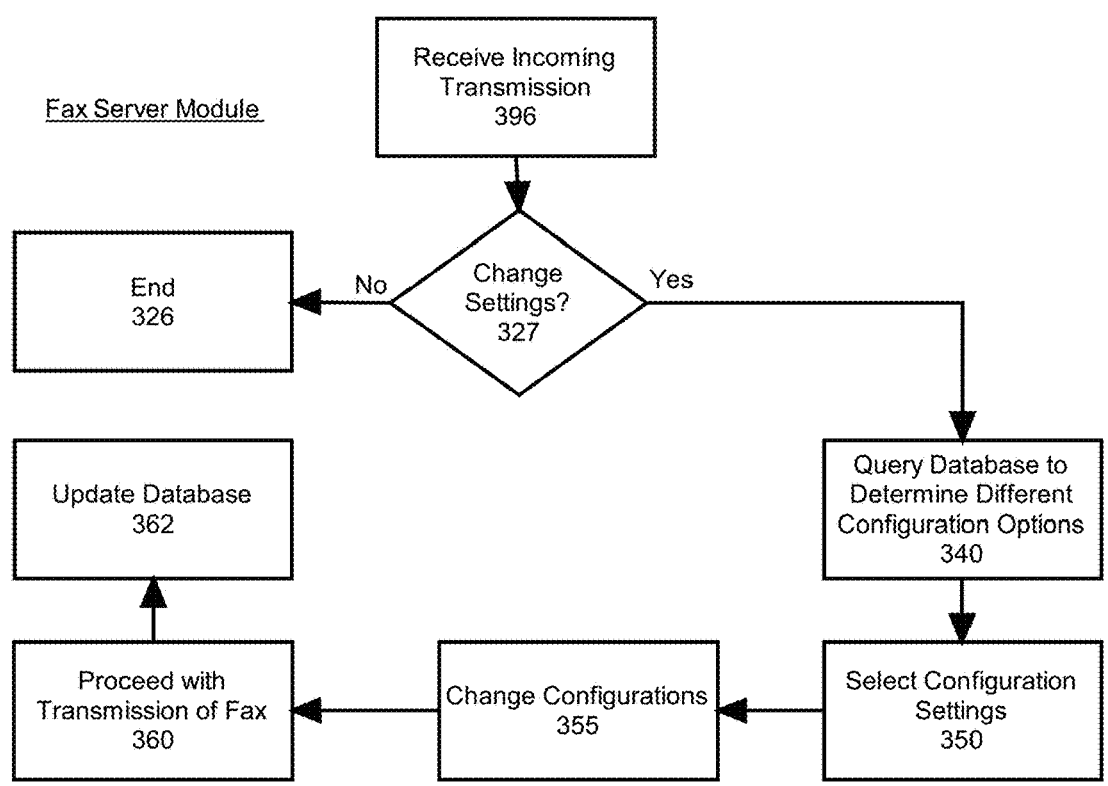
Figure 3C:
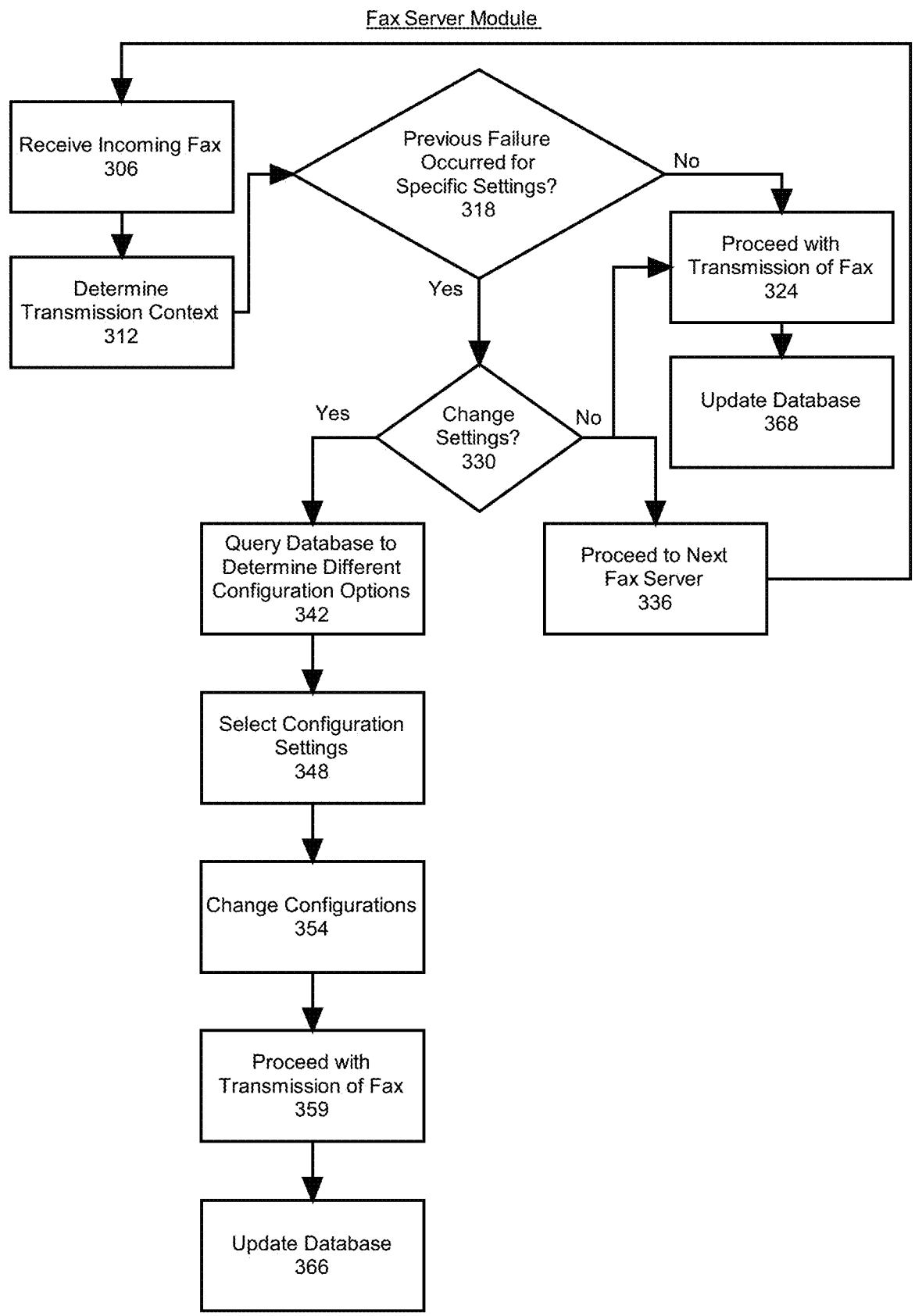

In even yet further illustration of the operation of the program code of the SIP proxy module 300A and the fax server module 300B, FIGS. 3A, 3B, and 3C are flow charts depicting a process for increasing the likelihood of success of facsimile transmissions. Upon receiving an incoming fax from a specified fax sender, as shown in block 305 of FIG. 3A, the SIP proxy module 300A determines a transmission context for the incoming fax directed to be transmitted by a designated fax server to a designated fax recipient, as illustrated in block 310. The SIP proxy module 300A further determines whether a prior facsimile of the same (determined) transmission context had been unsuccessfully transmitted by the designated fax server, as shown in block 315. In an embodiment, the SIP proxy module 300A determines whether there was a prior failed transmission for the same combination of numbers or just for the same originating number by querying a database with multiple, different entries of previous successful transmissions. The SIP proxy module 300A determines whether the same combination of numbers (the transmission context) or just one number that is part of the transmission context (for instance, the originating number) is listed in the database. If the combination of numbers or number is listed, then a previous transmission was successful. If the transmission was found to have been successful for the transmission context, the SIP proxy module 300A proceeds with the transmission of the facsimile, as illustrated in block 320. If the combination of numbers is not listed, then the transmission has not yet been successful for that determined transmission context. In a different embodiment, in which a database includes unsuccessful transmission data (transmission context, hardware information, and/or configuration settings), the transmission then will be listed if it has previously been unsuccessful for the determined transmission context, and a determination as to whether a prior transmission was unsuccessful would be positively determined if listed in the database.

In another embodiment, regardless of whether a database includes unsuccessful transmission data or successful transmission data, the SIP proxy module determines whether a previous failure has occurred, by querying either type of database with configurations of a specified fax sender in addition to any of the originating number or portion thereof, the dialed number or portion thereof, and both the originating number and dialed (destination) number or portions thereof.

In response to determining that there had been a prior unsuccessful transmission for the facsimile of the same transmission context, the SIP proxy module 300A determines whether different equipment is available for selection, such as different hardware, including a different fax board other than the original fax board, as shown in block 325.

Once it is determined that there is different equipment available for selection, one of the available different equipment options is selected, as illustrated in block 390. Then, optionally, a database listing different transmission contexts corresponding to equipment is updated to reflect the change in equipment for the received incoming fax (and the corresponding transmission context). Thereafter, the transmission of the fax continues, as in block 395. Further, upon the successful transmission of the facsimile, the database is updated, as shown in block 398, to indicate such along with information corresponding to the equipment (such as fax server and/or fax board) and the corresponding transmission context. In this way, the database accumulates the success data, which can be used for subsequent transmissions and devices. In a different embodiment, the database is updated for each unsuccessful transmission.

Figure 3D:
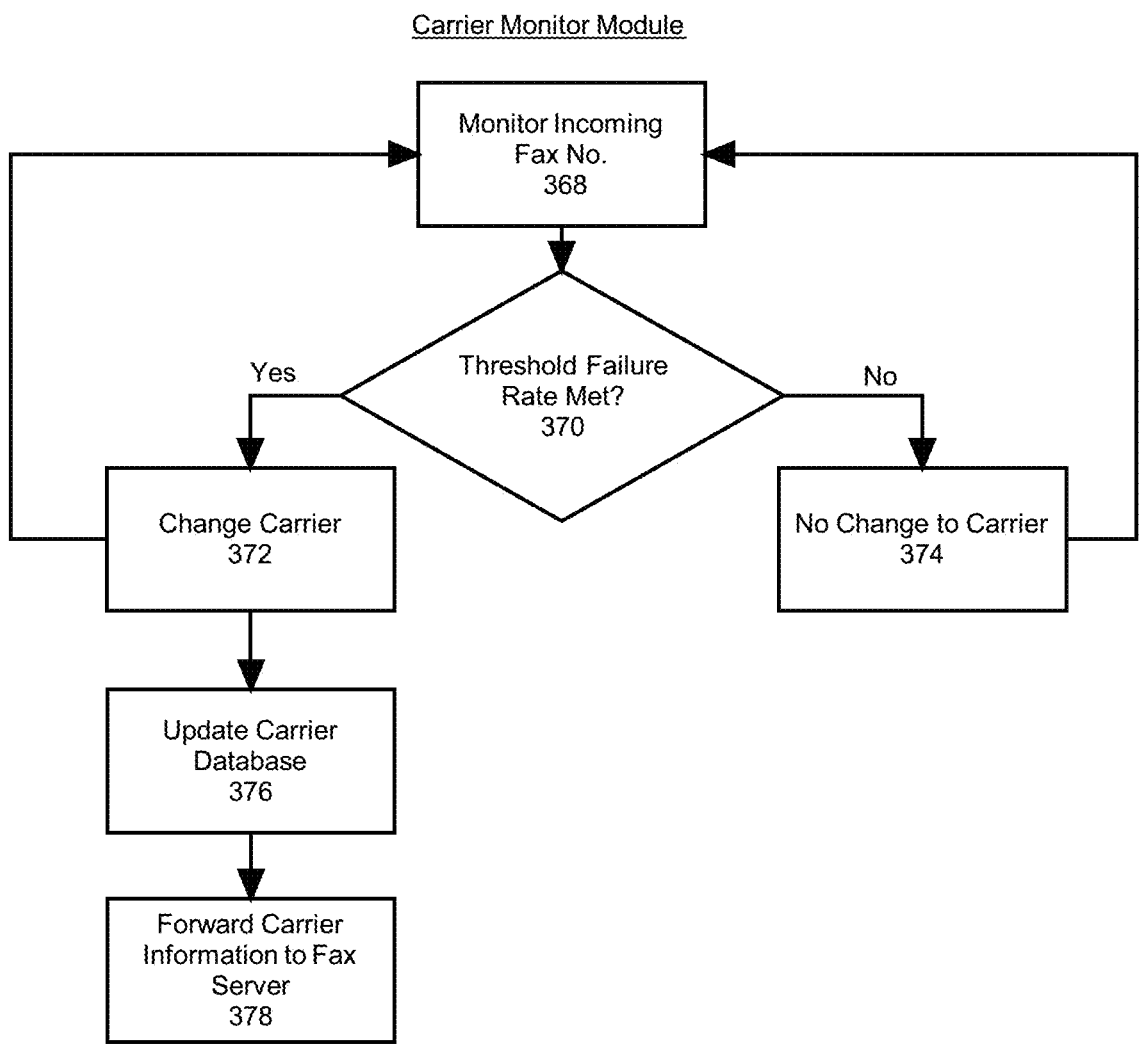

However, upon determining that different equipment is not available, as shown in block 325, the process then proceeds to the fax server, as illustrated in block 394, so that the program code of the fax server module 300B determines whether and which settings (or configurations) of the fax server can be changed and then actually changes the settings. More specifically, as shown in FIG. 3B, upon receiving an incoming transmission, as shown in block 396, the fax server module 300B, determines whether to change settings, as illustrated in block 327. Upon a determination that the settings of a fax server cannot be changed, the process ends, as in block 326. Of note, in a different embodiment, if the settings of the fax server cannot be changed, the carrier transmitting the facsimile may be adjusted, as illustrated in FIG. 3D. But if a determination is made that the settings can be changed, as shown in block 340, a database is queried to determine potential different configuration options for the (specific) fax server, such as information related to the fax board for the fax server, the compression method, the data transmission rate, the error correction mode (ECM), the number of allowed concurrent calls, the class, and stroke speed options. Of note, the database is the same database that stores information related to the different equipment available (as shown in FIGS. 2A and 2B) or a different database.

Upon querying the database, one or more configuration settings, such as the compression method and/or the data transmission rate, is selected, as illustrated in block 350, and then changed, as in block 355. In this way, some fax devices will have increased reliability when trained at forced lower speeds, with certain forced compression methods, or with error correction mode (ECM) specifically turned on or off. Then, optionally, a database listing different configuration options corresponding to specific equipment, such as a particular fax server and a specific carrier, can be updated to reflect the change in settings for the specific fax server or other equipment. Of note, the database can be the same as or different than the one including the database listing different transmission contexts corresponding to equipment and can be updated to reflect the change in equipment for the received incoming fax and the corresponding transmission context. Thereafter, the transmission of the fax continues, as in block 360. Further, upon the successful transmission of the facsimile, the database is updated, as shown in block 362, to indicate this as well as information related to the transmission context of the facsimile, the specific equipment used (which fax server or fax board, for example), carrier, and the specific configurations. In this way, the database accumulates the success data (including configuration settings and/or specific hardware details), which is used for subsequent transmissions and devices. In a different embodiment, the database is updated for each unsuccessful transmission. It should be understood that writing a record to a database (the updating of the database), shown in block 362, occurs at any point in the process whether as the last step as pictured, as a first step, or any point in between.

Of note, it should be understood that, though the invention is described herein with relation to FIGS. 3A and 3B as the SIP proxy module 300A determining whether a previous failure occurred (or success occurred) (block 315) and then proceeding through the other steps of FIG. 3A, the (program code of the) fax server module 300B also determines whether a previous failure or success occurred for an incoming fax and attempts to change the configuration settings of the equipment (following the steps of FIG. 3B) prior to changing the equipment itself (proceeding through the steps of FIG. 3A). In other words, some of the steps of FIG. 3B may be performed prior to all of the steps of FIG. 3A being performed. Further, in one embodiment, not all steps of FIG. 3B may be performed. For example, if a determination of the transmission context and a determination as to whether a previous failure occurred are performed by the fax server module 300B, then these steps may not be carried out by the SIP proxy module 300A. Additionally, if processing of the incoming fax is first carried out by the fax server module 300B, then instead of processing ending at block 326 of FIG. 3B (upon determining that settings cannot be changed), the process would proceed to the SIP proxy module 300A so that a determination is made as to whether different equipment is available (block 325). Further, regardless of whether equipment is changed or configuration settings modified, upon an unsuccessful transmission, the other option is explored and/or the same option tried again so that different options (different equipment or settings) are attempted.

In further illustration of this, FIG. 3C depicts the operation of the program code of a fax server module 300B that determines whether a previous failure or success occurred for an incoming fax, attempts to change the configuration settings of the equipment and can determine whether to change the equipment itself. More specifically, upon receiving an incoming fax from a specified fax sender, as shown in block 306 of FIG. 3C, the fax server module 300B determines a transmission context for the incoming fax directed to be transmitted by a designated fax server to a designated fax recipient, as illustrated in block 312. As previously indicated, the transmission context includes, but is not limited to, the originating phone number or caller ID of the specified fax sender and the phone number dialed (of the designated fax recipient). The transmission context further includes a subset of the originating phone number or number dialed, such as the area code or exchange to a specific number. Further, the transmission context includes either the originating number, the dialed number, or both.

The fax server module 300B can further determine whether a prior facsimile of the same (determined) transmission context having specific settings has been unsuccessfully transmitted, as shown in block 318. In other words, in block 318, a determination is made as to whether a phone number or portion thereof of a designated fax recipient and/or an originating number or portion thereof of the specified fax sender in combination with selected configurations for a received incoming fax image to be transmitted according to those selected configurations of a specified fax sender have previously failed or previously succeeded. In one embodiment, the fax server module 300B loads a database storing selected configurations of a specified fax sender and queries the database to obtain the current selected configurations of the specified fax sender. The fax server module 300B then determines whether there was a prior failed transmission for the same combination of numbers or just for the same originating number and corresponding current configurations of the specified fax sender by querying a database with multiple, different entries of previous successful transmissions (which includes previously selected configurations). The fax server module 300B determines whether the same combination of numbers (the transmission context) or just one number that is part of the transmission context—for instance, the originating number—is listed along with the current selected configurations of the designated fax server in the database. If the combination of numbers or number and current selected configurations is listed, i.e. there is a match between (1) the transmission context (the originating and or destination numbers, or portions thereof) and corresponding current selected configurations for a fax image to be transmitted and (2) the transmission context and corresponding previously selected configurations of a previous transmitted fax image, then a previous transmission was successful. If the transmission was found to have been successful for the transmission context (in other words, has not previously failed), the fax server module 300B proceeds with the transmission of the facsimile, as illustrated in block 324. If the combination of numbers and selected current configurations is not listed, then the transmission has not yet been successful for that the determined transmission context and the process proceeds to block 330.

In a different embodiment, in which a database includes unsuccessful transmission data (such as, transmission context, hardware information, and/or configuration settings), the transmission then will be listed if it has previously been unsuccessful for the determined transmission context and previously selected configurations, and a determination as to whether a prior transmission was unsuccessful would be positively determined if listed in the database. More specifically, the current configurations (settings) of the specified fax sender as well as the current assigned carrier can first be obtained. In one embodiment, this is done by loading a database storing selected configurations of the specified fax sender and querying the database storing the selected configurations of the specified fax sender to determine the selected configurations of the specified fax sender. The (current) selected settings along with the originating number and/or the designation number or portions thereof for a fax image to be transmitted is compared to previously selected configurations along with the corresponding originating number and/or the designation number or portions thereof for a previously transmitted fax image to determine whether there is or is not a match, thereby indicating whether there has been a previous failure for the combination of originating and/or designation phone numbers along with the current selected configurations. A determination that a prior transmission was unsuccessful occurs either when there is no match, i.e. no listing, in a database storing successful transmission data (at least a portion of a originating phone number and/or a destination phone number, hardware information, and/or configuration settings), or there is a match, i.e. a listing, in a database listing unsuccessful transmission data. Likewise, a determination that a prior transmission was successful occurs either when there is a match, i.e. a listing, in a database storing successful transmission data, or there is a no match, i.e. no listing, in a database listing unsuccessful transmission data. In such an embodiment, if there is no listing in the database, then the fax server module 300B proceeds with the transmission of the facsimile, as illustrated in block 324, and if there is a listing in the database indicating a prior transmission was unsuccessful, then the process would proceed to block 330.

In yet a different embodiment, there can be multiple, different databases, one database with multiple different tables (each table listing, for example, unsuccessful transmission data, successful transmission data, and current configurations of one or more of the specified fax senders and/or designated fax recipients), or a combination of one or more tables and one or more databases. For example, in an embodiment of multiple, different databases, there can be one database storing multiple, different entries of previous successful transmissions, which can include corresponding transmission data, such as, but not limited to, transmission context, hardware information, and/or configuration settings; there can be a different database storing unsuccessful transmission data, such as, but not limited to, transmission context, hardware information, and/or configuration settings; and, there can also be a different database storing the current selected configurations of a designated fax server In response to determining that there had been a prior unsuccessful transmission for the facsimile of the same transmission context and corresponding current selected configurations, the fax server module 300B determines whether to change settings (configurations), as illustrated in block 330. In one embodiment, the determination as to whether to change settings is based upon whether there are changes to settings that can be made. In another embodiment, the determination as to whether to change settings is based on a setting, such as a flag, which indicates whether or not a change of setting shall be undertaken. Regardless of how such a determination is made, if a determination is made that the settings should not be changed, the fax server module 300B, in one embodiment, rejects the fax and the fax is transferred (forwarded) to a next fax server, as shown in block 336, such as the next fax server in a "round-robin" set-up. The fax server module 300B of the next fax server repeats the analysis beginning with the receipt of the incoming fax, as shown in block 306. In a different embodiment, when a determination is made not to change the settings, the fax server module 300B instead proceeds with the transmission of the facsimile, as illustrated in block 324. Following any transmission of the fax, the database, optionally, is updated to reflect information related to the transmission context of the facsimile, the specific equipment used (which fax server or fax board, for example), and the specific configurations (settings), including the carrier used and whether or not the transmission was successful or unsuccessful, as shown in block 368. It should be understood that writing a record to a database (the updating of the database), shown in block 368, occurs at any point in the process whether as the last step as pictured, as a first step, or any point in between.

However, if in block 330, the fax server module 300B determines that the settings or configurations are to be changed, then a database is queried to determine potential different configuration options for the specific fax server, such as information related to the fax board for the fax server, the compression method, the data transmission rate, the error correction mode (ECM), the number of allowed concurrent calls, the class, and stroke speed options. Of note, the database can be the same database that stores information related to the different equipment available (as shown in FIGS. 2A and 2B) or a different database. In another embodiment, a single database includes different tables, such as one storing successful transmission data and a different table listing unsuccessful transmission data. Further, in yet a different embodiment, there are two different databases: a database storing multiple, different entries of previous successful transmissions and corresponding transmission data (transmission context, hardware information, and/or configuration settings) and another database storing previous unsuccessful transmission and corresponding transmission data. In such an embodiment with two different databases, the querying step shown in block 342 includes querying the database storing multiple, different entries of previous successful transmissions and corresponding transmission data to obtain setting options that have been previously successful for a transmission context and creating a list of different configuration settings.

In response to the querying of the database (whether one listing previous successful transmissions or unsuccessful transmissions), one or more configuration settings, such as the compression method and/or the data transmission rate, is selected, as illustrated in block 348, and then changed, as in block 354. More specifically, in an embodiment where there is a list of different configuration settings that can be changed, the fax server module 300B selects the first item in the list to change and the corresponding value and the configuration setting is changed to the indicated value. Of note, if the first item leads to an unsuccessful transmission, the next item in the list is selected and changed, until a transmission is successful. In a different embodiment, a randomly selected element in the list is selected and changed, and, if unsuccessful, another entry in the list can be randomly selected. In this way, based on previous experience, the fax server will have increased reliability when trained at forced lower speeds, with certain forced compression methods, or with error correction mode (ECM) specifically turned on or off. Thereafter, a new attempt to transmit the facsimile is made subsequent to the changing of the configuration of the fax server, as in block 359. Further, upon the successful transmission of the facsimile, the database is updated, as shown in block 366, to indicate a successful transmission (or in a different embodiment, an unsuccessful transmission) as well as information related to the transmission context of the facsimile, the specific equipment used (which fax server or fax board, for example), and the specific configurations (settings). In this way, the database accumulates the success data (including configuration settings and/or specific hardware details) or, in a different embodiment, the data related to a failure, which can be used for subsequent transmissions and devices.

It should be understood that the operation of the program code of a fax server module 300B is not limited to the sequence of steps (or blocks) shown in FIG. 3C. More specifically, in one embodiment, a record is written to a database that indicates a selected configuration of a fax server during a failed attempt at transmitting a fax image by the fax server. Thereafter, when a new fax image is to be transmitted to a recipient (by a specified fax sender), the fax server receives each of a new fax image to be transmitted to a recipient, a specified fax sender, and also at least a portion of a phone number. Of note, what is received indicating the specified fax sender includes, but is not limited to, the phone number or a portion thereof of the specified fax sender, the name of the specified fax sender, or a media access control address (MAC) of the specified fax sender. Of note, the portion of the received phone number includes at least a portion of an originating phone number of the specified fax sender, e.g. area code, central office code (the second part (the "456" of a 10 digit U.S. phone number (123-456-7890)), etc. or at least a portion of a destination phone number of the (fax) recipient, e.g. area code, central office code, etc. The program code of the fax server module 300B then retrieves a current selected configuration stored for the specified fax sender (from a database) into the memory of the fax server. Of note, the current selected configuration of the specified fax sender can be stored (1) in the same database also indicating a selected configuration of the fax server during a failed transmission attempt, (2) in a different database, or (3) in the same database but as part of a different table. The program code of the fax server module 300B then queries the database indicating the selected configuration of the fax server during a failed transmission attempt. Thereafter, on condition that a match is found, the program code of the fax server module 300B establishes that a prior facsimile transmitted by the specified fax sender was unsuccessful, but on condition that no match is found, the program code of the fax server module 300B transmits the new fax image by the fax server.

Additionally, the program code of the fax server module 300B determines whether to change configurations of the fax server on the condition that it is established that the prior facsimile transmitted by the specified fax sender was unsuccessful. Yet further, the program code of the fax server module 300B changes a configuration of the fax server upon determining to change the configurations of the specified fax server. Of note, as indicated herein, in one embodiment, the determination as to whether to change settings is determined based upon whether there are changes to settings that can be made. In another embodiment, the determination as to whether to change settings is determined based on a setting, such as a flag, which indicates whether or not a change of setting shall be undertaken.

As explained above, if a determination is made to change settings, then in one embodiment, a database is queried by the program code of the fax server module 300B to determine potential different configuration options for the (specific) fax server, such as information related to the fax board for the fax server and changing the hardware to a different fax board, the compression method, the data transmission rate, the error correction mode (ECM), the number of allowed concurrent calls, the class, and stroke speed options. Once the potential different configuration options are determined, in one embodiment, the program code of the fax server module 300B selects what configurations should be changed by selecting the first item in a list (or the last or according to a random number generator) and then changing a corresponding configuration, or, in a different embodiment, present the options to a user via a user interface, allowing the user to select which options should be changed by the program code of the fax server module 300B. For embodiments of the invention, where the program code of the fax server module 300B determines not to change the configurations of the fax server, the new fax image is instead transferred to a different fax server and the processes described herein is repeated for the different fax server.

In even yet further illustration of the operation of the program code of the carrier monitor module 301, FIG. 3D is a flow chart depicting a process for increasing the likelihood of success of facsimile transmissions by changing the carrier a facsimile is transmitted on. In this way, changes to a carrier in addition to changes to the fax server are utilized to increase the likelihood of a successful fax transmission. More specifically, the program code of the carrier monitor module 301 monitors one or more incoming fax numbers, as indicated in block 368, to determine whether a threshold failure rate is met, as shown in block 370. In an embodiment, the carrier monitor module 301 can continuously monitor one or more incoming fax numbers, or in a different embodiment, monitoring can occur according to a schedule (event scheduling).

Regardless of how the monitoring is accomplished, the program code of the carrier monitor module 301, in one embodiment, determines, for a particular fax number, whether or not a statistically lower percentage of successful transmissions have occurred. In one embodiment, the program code of the carrier monitor module 301 may determine the number of successful transmissions for the incoming facsimile number over a time period as well as an average number of successful transmissions for the incoming facsimile number for the same time period. Thereafter, if the number of successful transmissions on the incoming facsimile is less than the average number of successful transmission, the program code of the carrier monitor module 301 makes a determination that the threshold failure rate has been met. In addition, instead of just analyzing one incoming fax number to determine whether or not a threshold failure rate (or threshold success rate) has occurred, data from more than one incoming fax number on the same carrier can be utilized. In other words, a determination as to whether the threshold failure rate has been met may be determined by comparing the number of received transmissions over a time period for the incoming facsimile number to the average number of received transmissions for one or more incoming facsimile numbers over the same time period. Thereafter, if the number of received transmissions is less that the average number, a determination is made that the threshold failure rate has been met.

In a different embodiment, the program code of the carrier monitor module 301 determines for a particular fax number, whether or not a statistically lower percentage of successful transmissions have occurred in a set time frame. In yet a different embodiment, the program code of the carrier monitor module 301 determines for a particular fax number whether or not a statistically higher percentage of unsuccessful transmissions have occurred (in a specific time period or not). It should be understood that the program code of the carrier monitor module 301 works in conjunction with the program code of the fax server module 300B to obtain information stored in the database related to the success and/or failure of particular transmissions in order for the program code of the carrier monitor module 301 to determine whether or not the threshold failure rate has been met, exceeded, or whether a threshold success rate has not been met. Of note, what is statistically relevant would vary between systems and, thus, is not a specific value.

In another embodiment, the program code of the carrier monitor module 301 determines, for a particular fax number, whether or not a statistically lower percentage of transmissions (faxes/calls) have been received during specific time frame. For example, if an incoming fax number typically receives eight hundred (800) fax transmissions in an eight hour period, but the program code of the carrier monitor module 301 in a two hour period determines there have only been fifty transmissions in that same period, this would result in the program code of the carrier monitor module 301 making a determination that the threshold failure rate being met. Of note, a determination as to whether a threshold failure rate has or has not been met is not limited to only a specific time period, but may be determined from historical data related to how many transmissions are sent to an incoming fax number, regardless of time period. In addition, data from more than just one incoming fax number may be used in determining whether a threshold failure rate (or a threshold success rate) has or has not been met.

Upon a determination that the threshold failure rate, illustrated in block 370, has not been met, then the program code of the carrier monitor module 301 makes no change to the carrier, as shown in block 374. However, if a determination is made that the threshold failure rate is met (indicating a problematic carrier), then the program code of the carrier monitor module 301, changes the carrier associated with the incoming fax number, as illustrated in block 372. In one embodiment, the program code of the carrier monitor module 301 changes the carrier associated with an incoming fax number by changing a database entry to point to a different carrier corresponding to the incoming fax number.

More specifically, a database, such as a carrier database, contains one or more tables correlating one or more incoming fax numbers to one or more carriers. Upon a determination that the current carrier associated with an incoming fax number meets a threshold failure rate (and is, thus, determined problematic), the program code of the carrier monitor module 301 changes the listed carrier to a different one in the (carrier) database. In one embodiment, the new carrier is selected based upon a priority assigned to different carriers. For example, the carrier monitor module 301 can issue a query requesting a list of available carriers. If there is more than one carrier returned, a preference number with each carrier can be used to determine the priority of the carrier, where in one embodiment, the smallest preference number has the highest priority. In another embodiment, the highest preference number has the highest priority. Thereafter, the program code of the carrier monitor module 301 determines which carrier has the highest priority of the ones returned and selects it and changes the database entry to the selected new carrier. If the selected carrier is the current carrier, which has been determined to be problematic, the program code of the carrier monitor module 301 selects the next carrier with the highest priority. Of note, if no new carrier is available, the carrier is not changed, despite the carrier being determined problematic.

Once the carrier has been changed, the (carrier) database containing the data correlating incoming fax numbers with one or more carrier is updated to show the current carrier, as shown in block 376. The carrier information is further forwarded to the fax server, as in block 378, so the carrier information can be added to the database containing information related to successful and/or unsuccessful fax transmissions. In this way, changes to a carrier in addition to changes to the fax server are utilized to increase the likelihood of a successful fax transmission.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied therein.

Any combination of one or more computer readable medium(s) may be utilized. The computer readable medium may be a computer readable signal medium or a computer readable storage medium. A computer readable storage medium may include, for example, but not be limited to, an electronic, magnetic, optical, electromagnetic, infrared, or semiconductor system, apparatus, or device, or any suitable combination of the foregoing. More specific examples (a non-exhaustive list) of the computer readable storage mediums would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device. However, it is to be understood that a computer readable storage medium excludes transitory media such as transitory signals and other propagation media.

A computer readable signal medium may include a propagated data signal with computer readable program code embodied therein as in, for example, baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied in a computer readable medium may be transmitted using any appropriate medium, including, but not limited to, wireless, wireline, optical fiber cable, radiofrequency, and the like, or any suitable combination of the foregoing. Computer program code for carrying out operations for aspects of the present invention may be written in any combination of one or more programming languages, including an object-oriented programming language and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet via an Internet Service Provider).

Aspects of the present invention have been described above with reference to flowchart illustrations and/or block diagrams of methods, apparatuses (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combination of blocks in the block diagrams and/or flowchart illustrations, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer program instructions also may be stored in a computer readable medium that can direct a computer, other programmable data processing apparatus, or other devices to function in a particular manner, such that the instructions stored in the computer readable medium produce an article of manufacture including instructions which implement the function/act specified in the flowcharts and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention in various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. A method of increasing the success of a facsimile transmission, comprising:
monitoring an incoming facsimile number transmitting a fax image by a carrier;
determining a failure rate for the carrier based upon a number of received transmissions over a time period for the carrier transmitting the fax image on the incoming facsimile number as compared to an average number of received transmissions over the time period; and,
on condition that a threshold failure rate is met or exceeded by the determined failure rate for the carrier transmitting the fax image on the incoming facsimile number, adjusting the carrier to a new, different carrier by changing a record to indicate the new, different carrier in a database storing records correlating carriers to incoming facsimile numbers.

2. The method of claim 1, wherein the failure rate is determined for the carrier based upon a number of received transmissions over a time period for the carrier transmitting the fax image on the incoming facsimile number as compared to an average number of received transmissions over the time period for the incoming facsimile number.

3. The method of claim 1, wherein the failure rate is determined for the carrier based upon a number of received transmissions over a time period for the carrier transmitting the fax image on the incoming facsimile number as compared to an average number of received transmissions over the time period for the additional facsimile numbers.

4. The method of claim 1, wherein the failure rate is determined for the carrier based upon a number of successful transmissions over a time period for the carrier transmitting the fax image on the incoming facsimile number as compared to an average number of received transmissions over the time period for the additional facsimile numbers.

5. A facsimile management system comprising:
a server coupled to a database storing records correlating a carrier to an incoming facsimile number; and,
a carrier monitor module executing in a memory of the server, the carrier monitor module server comprising program code which when executed by a processor of the server enables to the server to:
monitor the incoming facsimile number transmitting a fax image by the carrier;
determine a failure rate for the carrier based upon a number of received transmissions over a time period for the carrier transmitting the fax image on the incoming facsimile number as compared to an average number of received transmissions over the time period; and,
on condition that a threshold failure rate is met or exceeded by the determined failure rate for the carrier transmitting the fax image on the incoming facsimile number, adjust the carrier to a new, different carrier by changing a record to indicate the new, different carrier in the database.

6. The system of claim 5, wherein the failure rate is determined for the carrier based upon a number of received transmissions over a time period for the carrier transmitting the fax image on the incoming facsimile number as compared to an average number of received transmissions over the time period for the incoming facsimile number.

7. The system of claim 5, wherein the failure rate is determined for the carrier based upon a number of received transmissions over a time period for the carrier transmitting the fax image on the incoming facsimile number as compared to an average number of received transmissions over the time period for the additional facsimile numbers.

8. The system of claim 5, wherein the failure rate is determined for the carrier based upon a number of successful transmissions over a time period for the carrier transmitting the fax image on the incoming facsimile number as compared to an average number of received transmissions over the time period for the additional facsimile numbers.

9. The system of claim 5, further comprising:
a fax server coupled to a database storing records indicating a selected configuration of the fax server during a failed attempt at transmitting the fax image; and,
a fax server module executing in a memory of the fax server, the fax server module comprising program code which when executed by a processor of the fax server enables the fax server to:
respond to the failed attempt at transmitting the fax image by the fax server by writing a record to the database that indicates the selected configuration of the fax server during the failed attempt;
receive, in a memory of the fax server, each of a new fax image to be transmitted to a recipient, a specified fax sender, and also at least a portion of a phone number,
retrieve, into the memory of the fax server, a current selected configuration stored for the specified fax sender,
query the database to determine whether the retrieved current selected configuration of the specified fax sender matches a record in the database, and
on condition that a match is found, establish that a prior facsimile transmitted by the specified fax sender was unsuccessful, but on condition that no match is found, transmit the new fax image by the fax server.

10. The system of claim 9, wherein the program code which when executed by the processor of the server further enables the server to forward the new carrier to the fax server.

11. A computer program product for increasing the success of facsimile transmission, the computer program product comprising:
a non-transitory computer readable storage medium having computer readable program code embodied therewith, which, when executed by a server, causes the server to:
monitor an incoming facsimile number transmitting a fax image by a carrier;
determine a failure rate for the carrier based upon a number of received transmissions over a time period for the carrier transmitting the fax image on the incoming facsimile number as compared to an average number of received transmissions over the time period; and,
on condition that that a threshold failure rate is met or exceeded by the determined failure rate for the carrier transmitting the fax image on the incoming facsimile number, adjust the carrier to a new, different carrier by changing a record to indicate the new, different carrier in the database.

12. The computer program product of claim 11, wherein the failure rate is determined for the carrier based upon a number of received transmissions over a time period for the carrier transmitting the fax image on the incoming facsimile number as compared to an average number of received transmissions over the time period for the incoming facsimile number.

13. The computer program product of claim 11, wherein the failure rate is determined for the carrier based upon a number of received transmissions over a time period for the carrier transmitting the fax image on the incoming facsimile number as compared to an average number of received transmissions over the time period for the additional facsimile numbers.

14. The computer program product of claim 11, wherein the failure rate is determined for the carrier based upon a number of successful transmissions over a time period for the carrier transmitting the fax image on the incoming facsimile number as compared to an average number of received transmissions over the time period for the additional facsimile numbers.

* * * * *